United States Patent
Stephenson

(10) Patent No.: US 8,745,847 B2
(45) Date of Patent: Jun. 10, 2014

(54) METHOD OF P-FORMING A CONTINUOUS CONDUCTOR HAVING A RECTANGULAR CROSS SECTION AND A STATOR INCLUDING A STATOR WINDING FORMED FROM A P-FORMED CONDUCTOR HAVING A RECTANGULAR CROSS-SECTION

(75) Inventor: Mark A. Stephenson, Fairland, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 398 days.

(21) Appl. No.: 13/298,890

(22) Filed: Nov. 17, 2011

(65) Prior Publication Data

US 2013/0127287 A1    May 23, 2013

(51) Int. Cl.
*H02K 15/04* (2006.01)

(52) U.S. Cl.
USPC .............................. 29/596; 29/598; 310/207

(58) Field of Classification Search
USPC ........................................... 29/596, 605, 606
See application file for complete search history.

(56) References Cited

U.S. PATENT DOCUMENTS

| | | |
|---|---|---|
| 3,496,394 A | 2/1970 | Balcke et al. |
| 3,532,402 A | 10/1970 | Beery et al. |
| 4,228,210 A | 10/1980 | Scribner |
| 4,429,927 A | 2/1984 | Kawabata |
| 4,606,000 A | 8/1986 | Steele et al. |
| 5,059,042 A | 10/1991 | Grierson |
| 5,245,237 A | 9/1993 | Fisher et al. |
| 5,315,195 A | 5/1994 | Bradfield et al. |
| 5,451,823 A | 9/1995 | Deverall et al. |
| 5,714,824 A | 2/1998 | Couture et al. |
| 5,744,892 A | 4/1998 | Mukai et al. |
| 5,780,953 A | 7/1998 | Umeda et al. |
| 5,977,669 A | 11/1999 | Yoshida et al. |
| 6,150,741 A | 11/2000 | Hayashi et al. |
| 6,201,332 B1 * | 3/2001 | Umeda et al. ................. 310/184 |
| 6,317,962 B1 | 11/2001 | Adachi et al. |
| 6,337,529 B1 * | 1/2002 | Higashino et al. ..... 310/216.008 |
| 6,376,961 B2 | 4/2002 | Murakami et al. |
| 6,486,580 B1 | 11/2002 | Cenzer et al. |
| 6,507,137 B2 | 1/2003 | Asao et al. |

(Continued)

FOREIGN PATENT DOCUMENTS

| | | |
|---|---|---|
| EP | 0923187 B1 | 2/2002 |
| JP | 1286755 A | 11/1989 |

(Continued)

OTHER PUBLICATIONS

International Search Report and Written Opinion for corresponding PCT Application No. PCT/US05/31347, dated Sep. 26, 2007, pp. 1-13.

(Continued)

*Primary Examiner* — Thanh Lam
(74) *Attorney, Agent, or Firm* — Cantor Colburn LLP

(57) ABSTRACT

A method of P-forming a conductor having a rectangular cross-section to create a continuous stator winding. The method includes forming a conductor having a rectangular cross-section into a series of first and second substantially parallel segments that meet at a vertex, deforming the conductor such that each of the first and second segments are non-parallel to form a cross-over feature at the vertex, and deforming a section of each of the first and second segments to include corresponding first and second portions that are generally parallel to create the continuous stator winding.

8 Claims, 6 Drawing Sheets

(56) References Cited

U.S. PATENT DOCUMENTS

| | | | |
|---|---|---|---|
| 6,657,338 B2 | 12/2003 | Fisher et al. | |
| 6,664,674 B2 | 12/2003 | Ihata | |
| 6,664,703 B2 | 12/2003 | Oketani et al. | |
| 6,754,946 B2 | 6/2004 | Nguyen | |
| 6,774,518 B2 | 8/2004 | Howe et al. | |
| 6,787,961 B2 * | 9/2004 | Neet et al. | 310/201 |
| 6,819,024 B1 | 11/2004 | Fujita et al. | |
| 6,831,382 B1 | 12/2004 | Lyle et al. | |
| 6,858,963 B2 * | 2/2005 | Neet | 310/201 |
| 6,885,127 B1 | 4/2005 | Higashino et al. | |
| 6,886,236 B2 | 5/2005 | Higashino et al. | |
| 7,132,775 B2 | 11/2006 | Oohashi et al. | |
| 7,143,501 B2 | 12/2006 | Bramson et al. | |
| 7,217,106 B2 | 5/2007 | Tanaka et al. | |
| 7,234,226 B2 | 6/2007 | Fujita et al. | |
| 7,281,312 B2 * | 10/2007 | Sadiku et al. | 29/596 |
| 7,282,830 B2 | 10/2007 | Harrer et al. | |
| 7,345,391 B2 | 3/2008 | Bradfield et al. | |
| 7,352,091 B2 | 4/2008 | Bradfield | |
| 7,417,344 B2 | 8/2008 | Bradfield | |
| 7,589,441 B2 | 9/2009 | Kalsi et al. | |
| 7,600,311 B2 | 10/2009 | Kreuzer et al. | |
| 7,687,954 B2 | 3/2010 | Neet et al. | |
| 8,519,577 B2 | 8/2013 | Stiesdal | |
| 2003/0233748 A1 | 12/2003 | Gorohata et al. | |
| 2004/0239190 A1 | 12/2004 | Rau et al. | |
| 2005/0006975 A1 | 1/2005 | Bradfield et al. | |
| 2007/0216253 A1 | 9/2007 | Shendi | |
| 2009/0001841 A1 | 1/2009 | Naganawa et al. | |
| 2009/0260217 A1 * | 10/2009 | Kamakura et al. | 29/596 |
| 2010/0077599 A1 | 4/2010 | Tokizawa | |
| 2010/0295390 A1 | 11/2010 | Rau | |
| 2011/0043059 A1 | 2/2011 | Wolf et al. | |
| 2011/0095639 A1 * | 4/2011 | Nakamura | 310/207 |

FOREIGN PATENT DOCUMENTS

| | | |
|---|---|---|
| JP | 1169721 A | 3/1999 |
| JP | 2011151933 A | 8/2011 |
| KR | 1020100070147 A | 6/2010 |

OTHER PUBLICATIONS

International Search Report and Written Opinion for PCT Application No. PCT/US2012/064753, dated Mar. 15, 2013, pp. 1-10.

International Search Report and Written Opinion for PCT Application No. PCT/US2012/064598, dated Mar. 18, 2013, pp. 1-10.

International Search Report and Written Opinion for PCT Application No. PCT/US2012/064947, dated Mar. 28, 2013, pp. 1-12.

* cited by examiner

US 8,745,847 B2

METHOD OF P-FORMING A CONTINUOUS CONDUCTOR HAVING A RECTANGULAR CROSS SECTION AND A STATOR INCLUDING A STATOR WINDING FORMED FROM A P-FORMED CONDUCTOR HAVING A RECTANGULAR CROSS-SECTION

BACKGROUND OF THE INVENTION

Exemplary embodiments pertain to the art of electric machines and, more particularly, to an electric machine including a P-formed continuous stator winding having a rectangular cross-section.

Electric machines include stators that are wound with one or more conductors. The one or more conductors form a stator winding that is designed to impart or receive an electromotive force from rotor windings to either power the electric machine in the case of an electric motor, or pass an electrical current to an external load in the case of a generator. In general, stator windings are formed with conductors having a circular cross-section or conductors having a rectangular cross-section. When forming a stator, the conductors are guided into slots formed in a stator core. As the stator winding is formed, conductors will overlap one another. In order to reduce bulk, the stator is subjected to a compacting operation that urges the conductors against one another to form a more compact component.

BRIEF DESCRIPTION OF THE INVENTION

Disclosed is a method of P-forming a conductor having a rectangular cross-section to create a continuous stator winding. The method includes forming a conductor having a rectangular cross-section into a series of first and second substantially parallel segments that meet at a vertex, deforming the conductor such that each of the first and second segments are non-parallel to form a cross-over feature at the vertex, and deforming a section of each of the first and second segments to include corresponding first and second portions that are generally parallel to create the continuous stator winding.

Also disclosed is a method of forming a stator winding for an electric machine. The method includes forming a conductor having a rectangular cross-section into a series of first and second substantially parallel segments that meet at a vertex, deforming the conductor such that each of the first and second segments are non-parallel to form a cross-over feature at the vertex, deforming a section of each of the first and second segments to include corresponding first and second portions that are generally parallel to establish a stator winding formed from a conductor having a rectangular cross-section, and inserting the continuous conductor having a rectangular cross-section into a stator core to establish a continuous phase winding of the stator.

Further disclosed is an electric machine including a housing, a rotor rotatably mounted relative to the housing, and a stator fixedly mounted relative to the stator. The stator includes a stator core having a plurality of slot segments, and a continuous P-formed stator winding element having a rectangular cross-section. The continuous P-formed stator winding element includes first and second generally parallel portions that meet at a vertex, and a cross-over feature at the vertex. Each of the first and second generally parallel portions being positioned in select ones of the plurality of slot segments with the cross-over feature being configured and disposed to nest with another continuous P-formed stator winding element.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
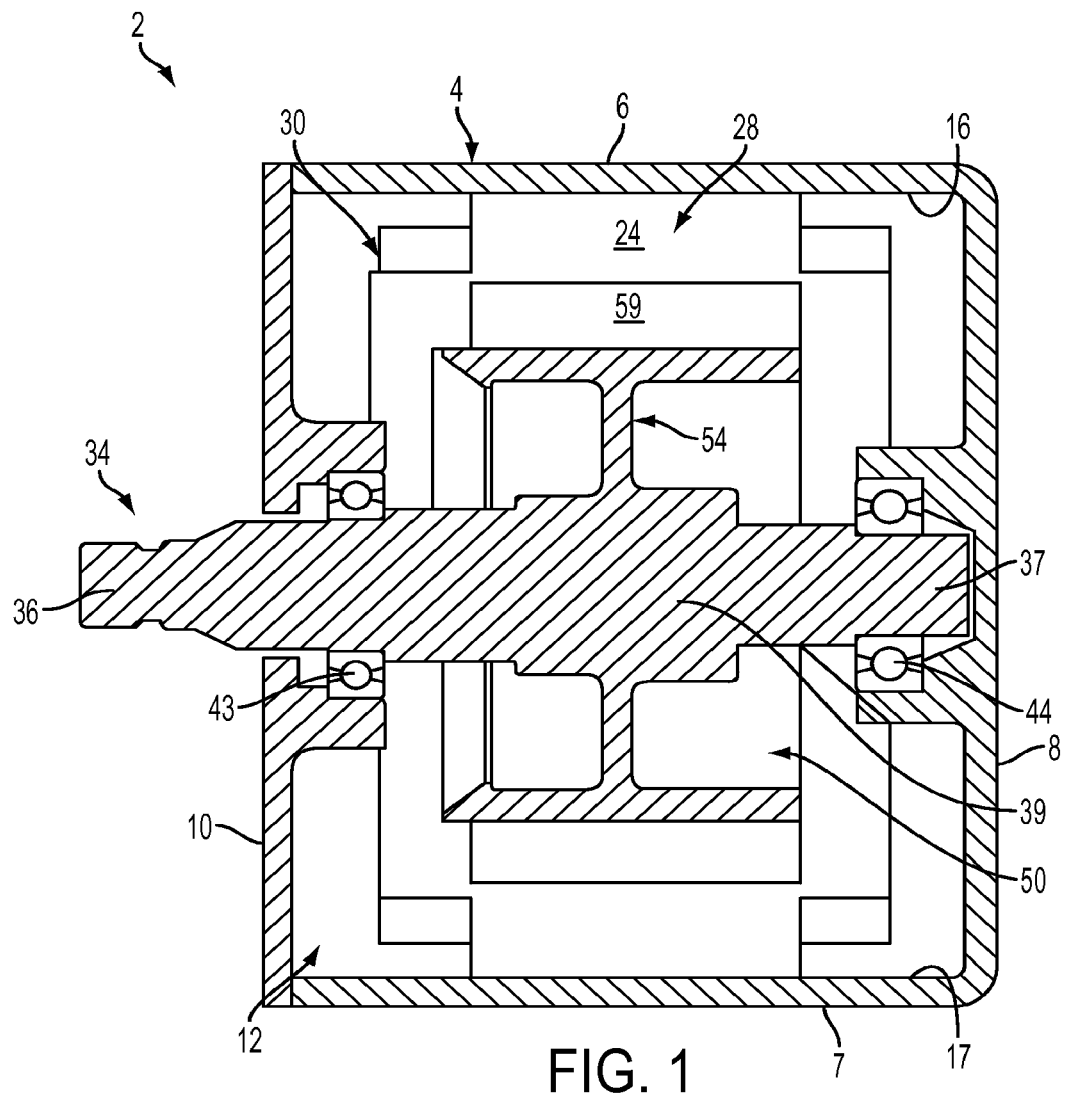
FIG. 1 depicts a partial cross-sectional view of an electric machine including a stator having a stator winding formed from a P-formed conductor having a rectangular cross-section.
Figure 2:
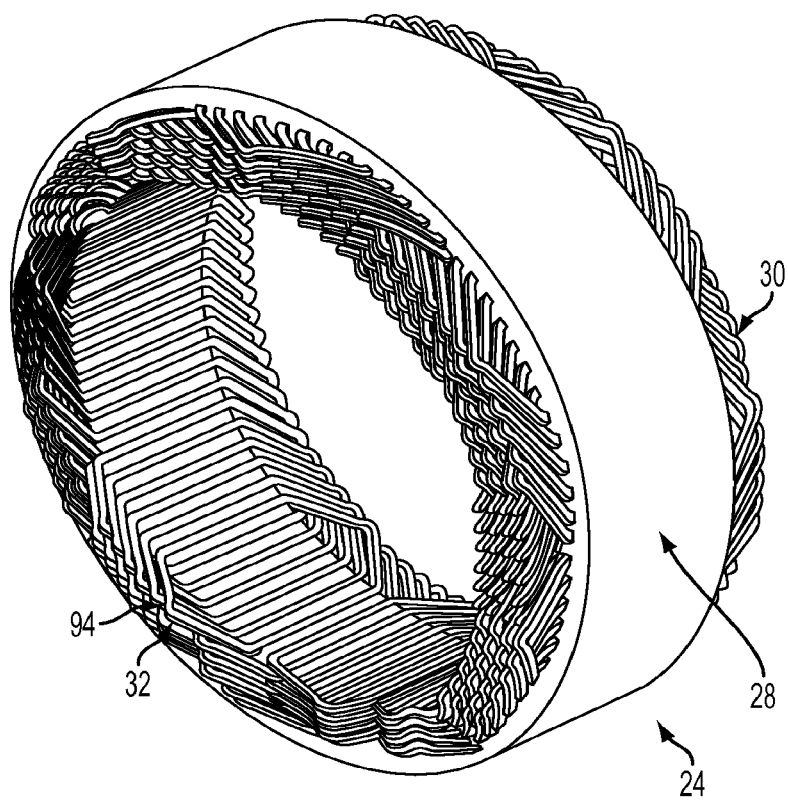
FIG. 2 depicts a partial perspective view of the stator of FIG. 1.
Figure 3:
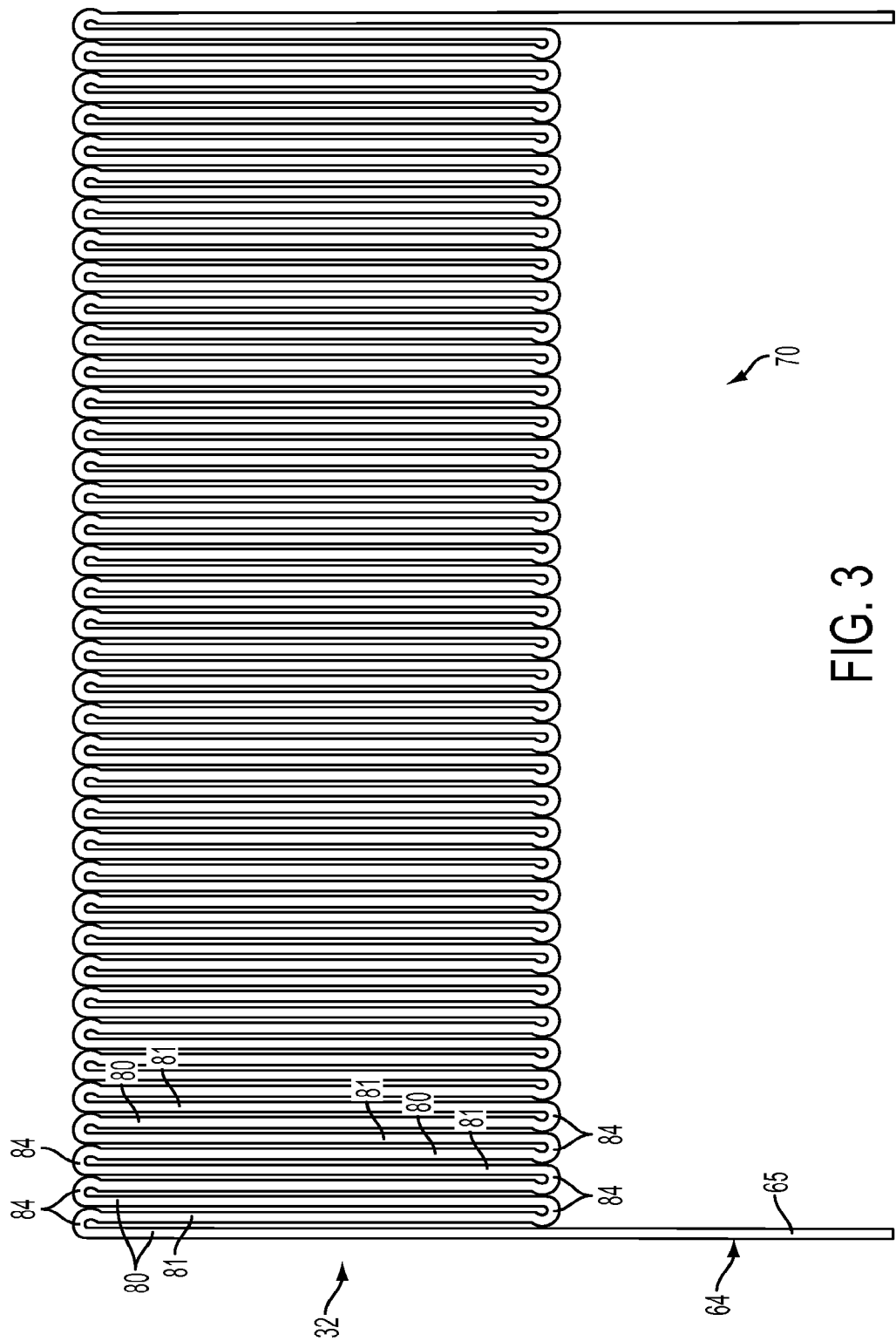
FIG. 3 depicts a plan view of a P-formed conductor preform in accordance with an exemplary embodiment.

An electric machine in accordance with an exemplary embodiment is indicated generally at 2 in FIG. 1. Electric machine 2 includes a housing 4 having first and second side walls 6 and 7 that are joined by a first end wall 8 and a second end wall or cover 10 to collectively define an interior portion 12. First side wall 6 includes an inner surface 16 and second side wall 7 includes an inner surface 17. At this point it should be understood that housing 4 could also be constructed to include a single side wall having a continuous inner surface. Electric machine 2 is further shown to include a stator 24 arranged at inner surfaces 16 and 17 of first and second side walls 6 and 7. As shown in FIG. 2, stator 24 includes an annular stator core 28 which, as will be discussed more fully below, supports a plurality of stator windings 30. Stator windings 30 are formed from a plurality of discrete continuous P-formed stator winding elements, one of which is indicated at 32. As shown, continuous stator winding elements 32 are arranged in slot segments (not separately labeled) of stator core 28. As will be discussed more fully below, continuous stator winding elements 32 nest with adjacent continuous stator winding elements (not separately labeled) to reduce an overall form factor for stator windings 30.

Electric machine 2 is also shown to include a shaft 34 rotatably supported within housing 4. Shaft 34 includes a first end 36 that extends to a second end 37 through an intermediate portion 39. First end 36 is rotatably supported relative to second end wall 10 through a first bearing 43 and second end 37 is rotatably supported relative to first end wall 8 through a second bearing 44. Shaft 34 supports a rotor assembly 50 that is rotatably mounted within housing 4. Rotor assembly 50 includes a rotor hub 54 that is fixed relative to intermediate portion 39, and a rotor lamination 59 that is configured to rotate relative to stator 24.

Figure 4:
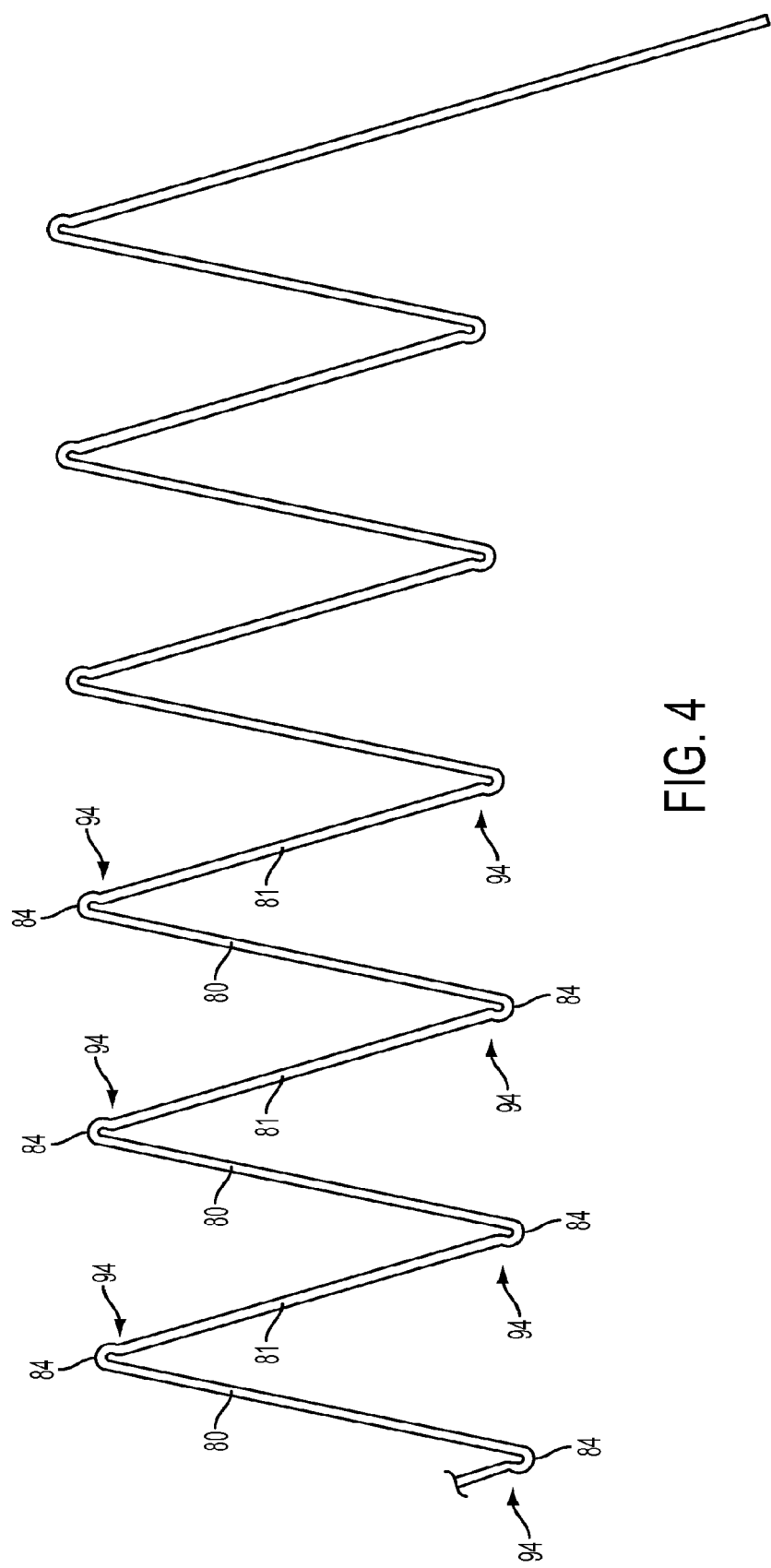
FIG. 4 depicts a plan view of the P-formed conductor preform following a first deformation process.

In accordance with an exemplary embodiment, continuous P-formed stator winding element 32 is formed from a conductor 64 having a rectangular cross-section 65. In accordance with one aspect of the exemplary embodiment, conductor 64 is initially formed into a "P"-formed preform 70 having a series of first and second segments 80 and 81 joined at a vertex 84. P-formed preform 70 is formed such that each of the first and second segments 80 and 81 are substantially parallel to one another. Once formed, P-formed preform 70 is manipulated causing the series of first and second segments 80 and 81 to be non-parallel to one another such as shown in FIG. 4. The manipulation of P-formed preform 70 forms cross-over features 94 at each vertex 84. Cross-over features 94 constitute a particular bend or twist that is configured to receive an adjacent stator winding (not separately labeled) when continuous P-formed stator winding element 32 is installed in stator core 28.

Figure 5:
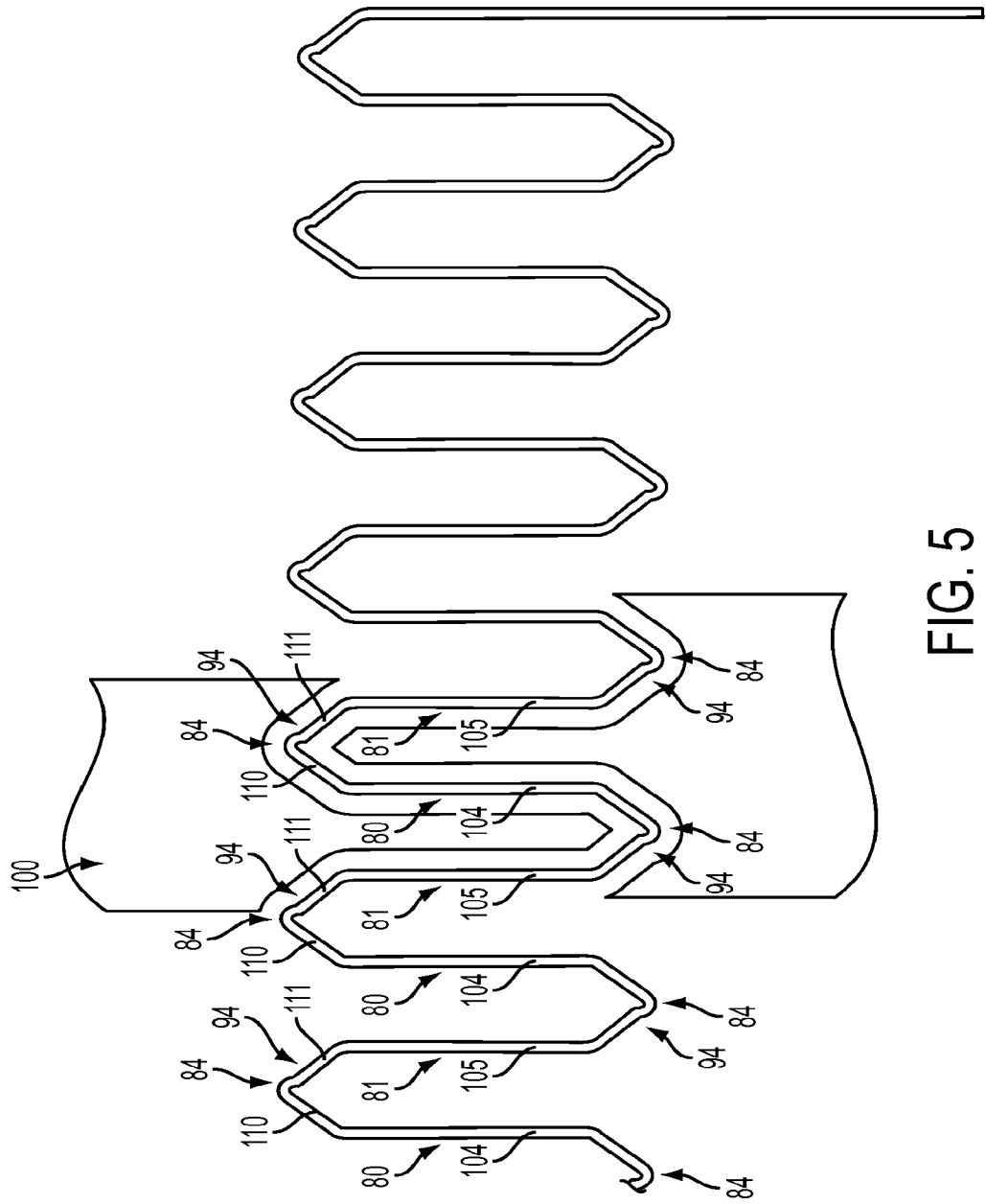
FIG. 5 depicts the P-formed preform of FIG. 4 following a second deformation process to form a continuous stator winding in accordance with an exemplary embodiment.
Figure 6:
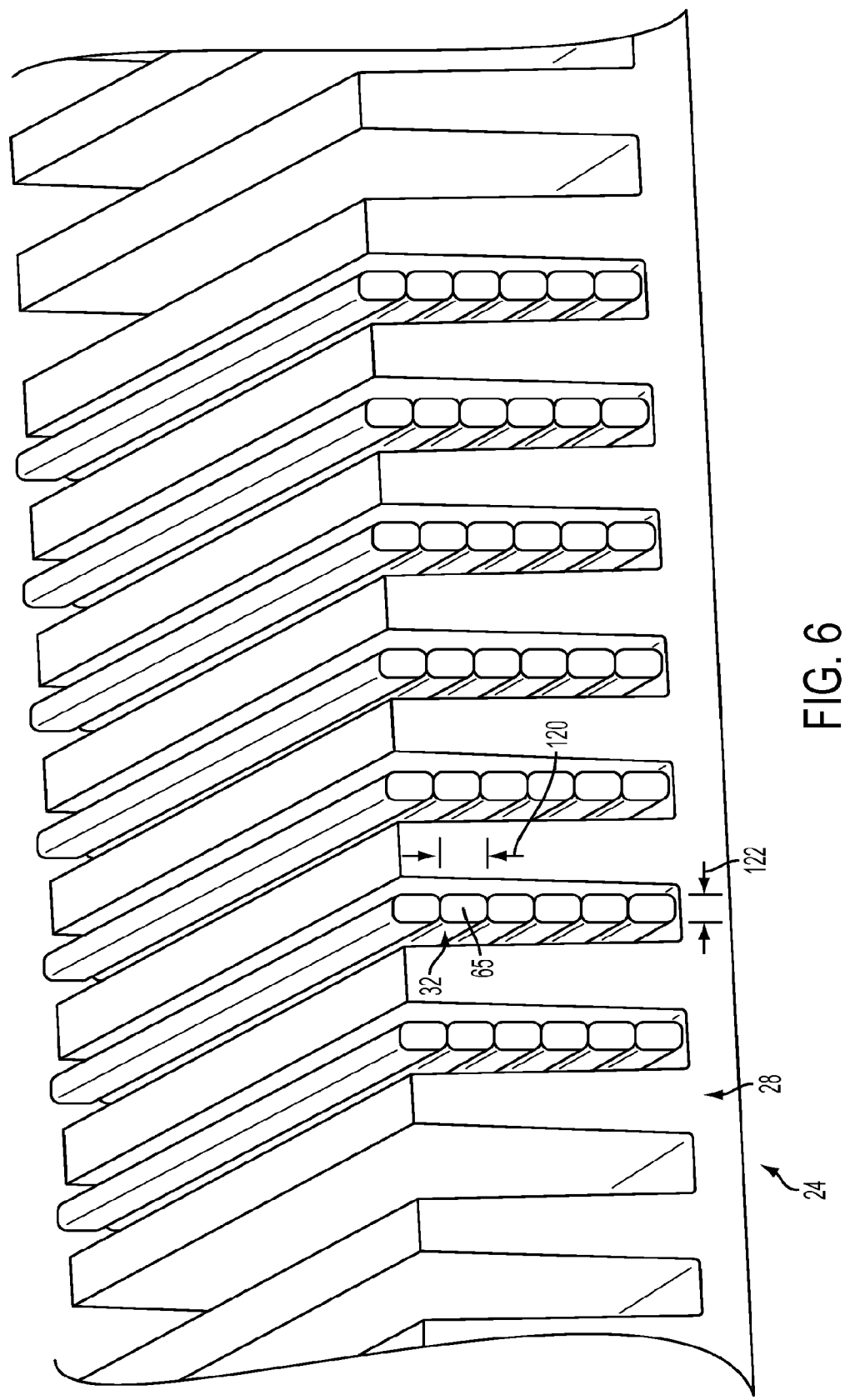
FIG. 6 depicts a partial cross-sectional view of the stator of FIG. 2.

After forming cross-over features 94, continuous P-formed stator winding element 32 is placed in a die 100 that deforms each of the first and second segments 80 and 81 to create first and second substantial parallel portions 104 and 105 and first and second angled portions 110 and 111 such as shown in FIG. 5. At this point, stator winding 64 is inserted into stator core 28 such as shown in FIG. 6. More specifically, rectangular cross-section includes a first dimension or width 120 and a second dimension or width 122. First width 120 is greater than second width 122. Stator winding 64 is inserted into the slot segments (not separately labeled) with first width 122 extending along a radius of stator core 28.

As discussed above, continuous P-formed stator winding element 32 is arranged in stator core 28 such that cross-over feature 98 receives or nests with adjacent continuous stator windings. In this manner, cross-over feature 98 allows stator windings 30 to form a more compact assembly when installed in stator core 28. Thus, in contrast to prior art arrangements that compact stator windings following installation to the stator core, the exemplary embodiment provides stator windings that do not require compaction in order to form a desired stator geometry. Stator windings subjected to compaction or compression are generally unsuitable for high voltage application. The compaction or compression process can introduce points that allow higher voltages to jump across adjacent windings and cause a short circuit. A compact stator formed without a compaction step such as in accordance with the exemplary embodiment, is thus suitable for applications that employ higher voltages.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of P-forming a conductor having a rectangular cross-section to create a continuous stator winding, the method comprising:

forming a conductor having a rectangular cross-section into a series of first and second substantially parallel segments that meet at a vertex;

deforming the conductor such that each of the first and second segments are non-parallel to form a cross-over feature at the vertex; and deforming a section of each of the first and second segments to include corresponding first and second portions that are generally parallel to create the continuous stator winding.

2. The method of claim 1, wherein deforming the conductor to form the cross-over feature includes imparting a twist at the vertex.

3. The method of claim 1, wherein deforming the section of each of the first and second segments includes die forming the section of each of the first and second segments to include the corresponding first and second portions that are generally parallel.

4. The method of claim 1, wherein forming the conductor having a rectangular cross-section into a series of first and second substantially parallel segments that meet at a vertex includes forming a P-formed preform.

5. A method of forming a stator winding for an electric machine, the method comprising:

forming a conductor having a rectangular cross-section into a series of first and second substantially parallel segments that meet at a vertex;

deforming the conductor such that each of the first and second segments are non-parallel to form a cross-over feature at the vertex;

deforming a section of each of the first and second segments to include corresponding first and second portions that are generally parallel to establish a stator winding formed from a conductor having a rectangular cross-section; and inserting the continuous conductor having a rectangular cross-section into a stator core to establish a continuous phase winding of the stator.

6. The method of claim 5, wherein inserting the continuous conductor having a rectangular cross-section into the stator core includes laying the first and second portions into slot segments formed in the stator core.

7. The method of claim 5, wherein the continuous conductor includes a first width that is greater than a second width, inserting the continuous conductor having a rectangular cross section into the stator includes arranging the continuous conductor in one or more slot segments with the first width extending along a radius of the stator.

8. The method of claim 5, wherein forming the conductor having a rectangular cross-section into a series of first and second substantially parallel segments that meet at a vertex includes forming a P-formed preform.

* * * * *